United States Patent
Obaidi

(10) Patent No.: US 11,678,178 B2
(45) Date of Patent: Jun. 13, 2023

(54) APPLICATION-BASED SECURITY MONITORING APPLICATION

(71) Applicant: T-Mobile USA, Inc., Bellevue, WA (US)

(72) Inventor: Ahmad Arash Obaidi, Sammamish, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 17/121,301

(22) Filed: Dec. 14, 2020

(65) Prior Publication Data

US 2022/0191688 A1 Jun. 16, 2022

(51) Int. Cl.
| | |
|---|---|
| *H04W 12/033* | (2021.01) |
| *G06F 21/60* | (2013.01) |
| *H04L 9/08* | (2006.01) |
| *H04L 9/30* | (2006.01) |
| *H04W 12/12* | (2021.01) |

(52) U.S. Cl.
CPC ........ *H04W 12/033* (2021.01); *G06F 21/602* (2013.01); *H04L 9/0825* (2013.01); *H04L 9/3073* (2013.01); *H04W 12/12* (2013.01)

(58) Field of Classification Search
CPC ... H04W 12/033; H04W 12/12; G06F 21/602; H04L 9/0825; H04L 9/3073
See application file for complete search history.

(56) References Cited

U.S. PATENT DOCUMENTS

| | | | |
|---|---|---|---|
| 7,845,013 B2 | 11/2010 | Bhogal et al. | |
| 8,239,918 B1* | 8/2012 | Cohen | G06F 21/128 726/1 |
| 9,866,589 B1 | 1/2018 | Stuntebeck | |
| 10,536,478 B2 | 1/2020 | Kirti et al. | |
| 2005/0078828 A1* | 4/2005 | Zheng | H04W 8/245 380/270 |
| 2006/0021012 A1* | 1/2006 | Ito | G06Q 20/382 726/5 |
| 2006/0294391 A1* | 12/2006 | Wu | H04L 9/16 713/182 |
| 2013/0246199 A1* | 9/2013 | Carlson | G06Q 20/405 705/16 |
| 2018/0176192 A1* | 6/2018 | Davis | H04L 9/3247 |

* cited by examiner

*Primary Examiner* — Ayoub Alata
(74) *Attorney, Agent, or Firm* — Han Santos, PLLC

(57) ABSTRACT

This disclosure describes techniques that enable a security monitoring application to detect the use of plaintext sensitive data by a user application on a user device. The security monitoring application may reside on a user device or may reside on a standalone device, such as a security monitoring controller, within an enterprise network. The security monitoring application may be configured to intercept a computing operation executed by a user application that includes user-plane data. In doing so, the security monitoring application may determine whether the user-plane data includes plaintext sensitive data and if so, quarantine the user-plane data.

20 Claims, 8 Drawing Sheets

APPLICATION-BASED SECURITY MONITORING APPLICATION

BACKGROUND

Organizations may implement computing environments (e.g. enterprise computing environments) that rely on many technology devices, software, hardware, and/or computing services. Increasingly, these computing environments cater software user applications that enable user devices to obtain additional functionality and/or capability beyond what is available solely on the user device. Such user applications may leverage access to data available on the user devices to provide a personalized and targeted user experience.

As user applications become a more ubiquitous part of our daily lives, so too does their reliance on user data to improve user experience. For example, a user application that suggests eateries or public events may capture a user's current geolocation and calendar data to infer a set of relevant recommendations. In this way, the user experience is meaningfully improved. However, the corollary to a reliance on user data to improve user experience is the risk of inadvertent disclosure. By making user data, such as sensitive data, available to more user applications for the purpose of improving the quality of their user experience, the risk of disclosing such user data to the public also increases.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 1A illustrates a computing environment that facilitates a security monitoring application operating via a user device, in accordance with at least one embodiment. FIG. 1B illustrates a computing environment that facilitates a security monitoring application operating via a security monitoring controller within an enterprise network, in accordance with at least one embodiment.

FIG. 2A illustrates a block diagram for an operation of a security monitoring application that is accessible via a user device, in accordance with at least one embodiment. FIG. 2B illustrates a block diagram for an operation of a security monitoring controller within an enterprise network, in accordance with at least one embodiment.

DETAILED DESCRIPTION

Figure 1A:
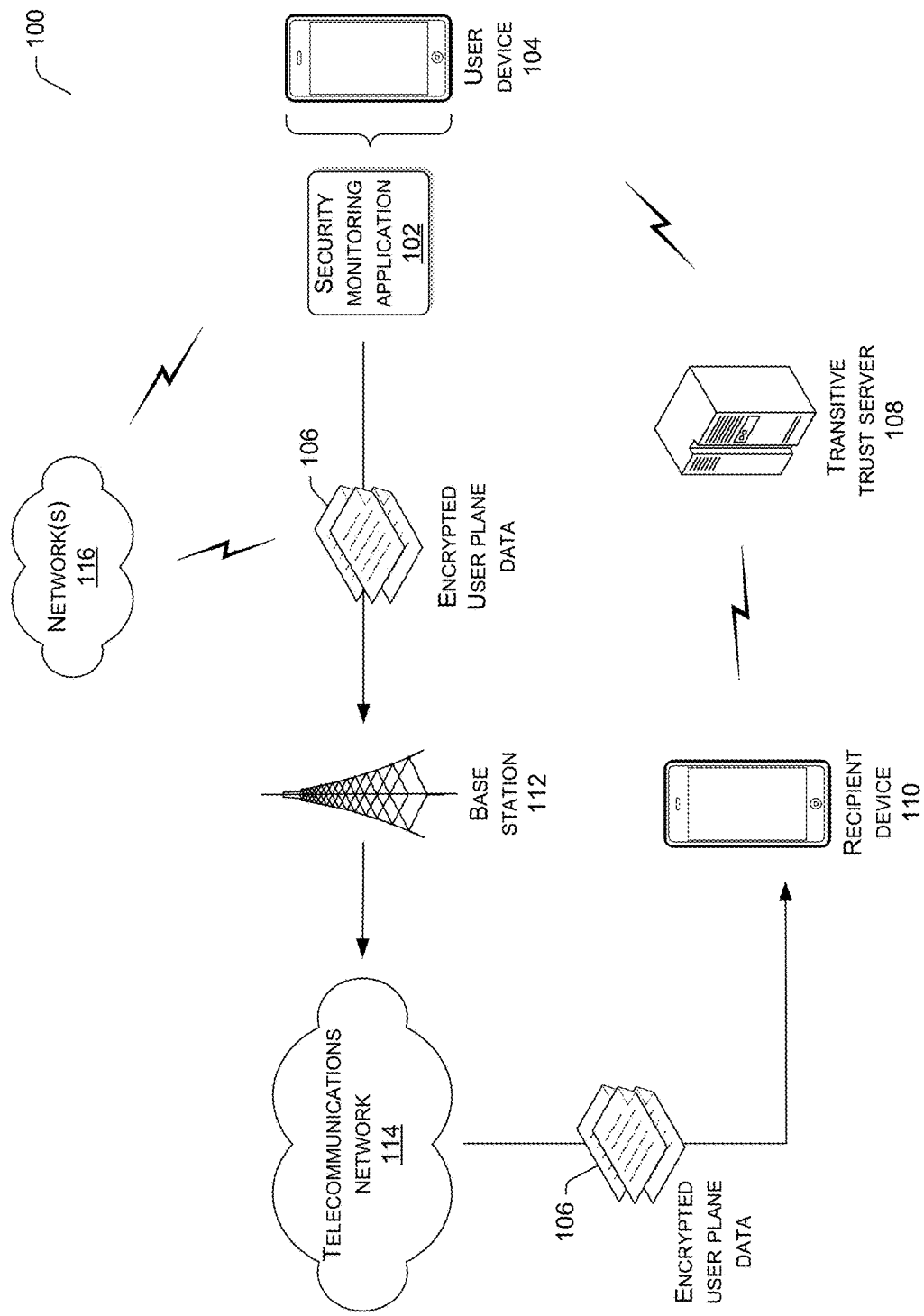
FIGS. 1A and 1B illustrate example computing environments that facilitate the operation of the security monitoring application.

This disclosure describes techniques for monitoring the use of sensitive data by user applications on a user device. A security monitoring application is described that may monitor computing operations executed by a user application to determine whether those computing operations involve plaintext sensitive data. The term "plaintext sensitive data" refers to sensitive data that is in an unencrypted format. Sensitive data that is in an encrypted format is considered non-sensitive data, because sensitive data is protected from third-parties through the encryption process.

Sensitive data, as described throughout this disclosure, relates to user-plane data that may be used to identify an individual (e.g. personal information) or user-plane data that is to be kept confidential and has been classified, as such. Sensitive data, as it relates to personally identifiable information, may include user profile data, such as current and historical geolocation data, personal contact data, device identifiers, user financial data, user calendar data, company data, or any suitable form of data accessible via the user device that can individually, or in combination with other data, identify an individual. Sensitive data as it relates to confidential information, may include user-plane data that has been classified as sensitive, proprietary, confidential, restricted, secret, or any other suitable classification. The classification of sensitive data is discussed in further detail within this disclosure.

Plaintext sensitive data may include unencrypted forms of human-readable data and machine-readable data. Human-readable data includes text, audio, images, in any suitable format. Machine-readable data includes HTML data, XML data, or any suitable script data.

In the event that plaintext sensitive data is detected, the security monitoring application may suspend the computing operation and quarantine the plaintext sensitive data. Alternatively, the security monitoring application may facilitate encryption of the plaintext sensitive data, prior to executing the computing operation, thereby preventing an inadvertent disclosure. If the security monitoring application determines that the computing operation does not involve plaintext sensitive data, the security monitoring application may permit the execution of the computing operation.

The security monitoring application may reside on a user device and monitor computing operations at a system bus of the user device. Alternatively, the security monitoring application may be accessible by the user device via one or more network(s). The system bus provides a communication pathway between hardware and software components of a user device. By monitoring the system bus, the security monitoring application may detect computing operations that involve plaintext sensitive data at an application layer, a transport layer, a network layer, a data link layer, or a physical layer of the user device. Each of the preceding layer definitions is pursuant to the conceptual Open System Interconnection (OSI) model framework.

To detect plaintext sensitive data, the security monitoring application may intercept computing operations executed by a user application. The computing operations may be intercepted prior to execution at one of the OSI layers (e.g. application, transport, network, datalink, or physical layers) to ensure that plaintext sensitive data is not inadvertently disclosed. Computing operations may relate to a change in a data state. Data states include "data at rest," "data in transit," and "data in use." "Data at rest" refers to data stored on media. "Data in transit" refers to a transfer of data between components of the user device (e.g. between any suitable combination of hardware and software components) or an outbound transfer of data from the user device. "Data in use" refers to data stored in memory or temporary storage buffers for temporal use by a user application. Therefore, a change in data state may correspond to an act to store user-plane data in a repository (e.g. data at rest), retrieve user-plane data from a repository (e.g. data at rest), transmit user-plane data to an outbound recipient device (i.e. data in transit), or perform a calculation using user-plane data on the user device (e.g. data in use).

In response to intercepting a computing operation, the security monitoring application may inspect the user-plane data to determine whether it includes plaintext sensitive data. The term "user-plane data" is used throughout this disclosure to describe the data used, stored, and transferred, by a user application. User-plane data may include plaintext sensitive data and non-sensitive data. Non-sensitive data includes data that does not personally identify an individual and data that is not to be kept confidential. Non-sensitive data may include plaintext non-sensitive data, encrypted non-sensitive data, and encrypted plaintext sensitive data. In each of these examples, an inadvertent disclosure of non-sensitive data to third-parties does not compromise any personally identifiable information or confidential information.

The security monitoring application may inspect the user-plane data to determine whether it includes plaintext sensitive data. If plaintext sensitive data is identified, the security monitoring application may quarantine the user-plane data and suspend the related computing operation. As part of quarantining the user-plane data, the security monitoring application may encrypt the user-plane data and store the encrypted user-plane data within a repository of the user device.

The term "encrypted user-plane data" is intended to describe user-plane data that has been encrypted in its entirety. The encrypted user-plane data may include plaintext sensitive data. An entirety of the user-plane data may correspond to plaintext sensitive data. Alternatively, the plaintext sensitive data may account for a portion, but not all, of the user-plane data. The term "encrypted user-plane data" also describes the encryption of subsets of user-plane data that correspond to plaintext sensitive data. Here, the user-plane data may include a first subset of plaintext sensitive data and the second subset of non-sensitive plaintext data. The first subset of plaintext sensitive data may be encrypted, while the remaining second subset of non-sensitive plaintext data, may remain as plaintext.

If the security monitoring application determines that user-plane data includes plaintext sensitive data and non-sensitive data, the security monitoring application may remove and/or redact the plaintext sensitive data from the user-plane data to create modified user-plane data, and permit the execution of the computing operation using the modified user-plane data. In this example, the plaintext sensitive data may be replaced with non-sensitive placeholder data. For example, precise geolocation (e.g. street address) may be replaced with regional geolocation data (e.g. country). Also, name and/or device identifiers may be replaced with randomly generated character strings. Further, the plaintext sensitive data that is removed and/or redacted may be stored as encrypted plaintext sensitive data (e.g. non-sensitive data) within a repository of the user device.

Alternatively, the security monitoring application may perform acts to purge the plaintext sensitive data, thereby permitting the computing operation to execute with modified user-plane data that does not include the plaintext sensitive data. Note that purging plaintext sensitive data relates to an instance of the plaintext sensitive data that has been called to execute the operation. The plaintext sensitive data at the source remains unaffected. For example, consider a computing operation that involves retrieving plaintext sensitive data from a repository on the user device. The security monitoring application may detect a system or application call to retrieve the plaintext sensitive data, and in doing so, purge the instance of plaintext sensitive data retrieved from the repository. The original copy of the plaintext sensitive data, however, remains unaffected and stored within the repository of the user device.

The security monitoring application may employ one of several methods to determine whether user-plane data includes plaintext sensitive data. In one example, the security monitoring application may inspect the user-plane data to identify an application identifier. The application identifier may be used to identify the user application, and based on the identity of the user application, the security monitoring application may infer whether or not the user-plane data includes plaintext sensitive data. In one example, the security monitoring application may employ one or more machine-learning algorithms to analyze historical instances of data usage by a user application. In doing so, the security monitoring application may infer whether an application call associated with user-plane data is likely associated with plaintext sensitive data.

In another example, the security monitoring application may identify the source of user-plane data associated with the computing operation, and in doing so, infer whether the user-plane data includes plaintext sensitive data. For example, the user application may capture geolocation data from a GPS sensor, appointment data from a calendar application, contact data from a user profile application, or private (e.g. personal or organizational) data from a secure repository. In each of these examples, the security monitoring application may infer the presence of plaintext sensitive data, based on identifying the source of the user-plane data.

In yet another example, the security monitoring application may analyze the user-plane data to identify plaintext sensitive data. In this example, the security monitoring application may correlate the user-plane data with profiles that are typical of plaintext sensitive data. For example, device identifiers, contact data, geolocation data, and other forms of plaintext sensitive data may adhere to an established format. By correlating the user-plane data with plaintext sensitive data profiles, the security monitoring application may infer the presence of plaintext sensitive data within user-plane data.

The security monitoring application may generate a sensitivity score, which is intended to classify a likelihood that user-plane data, or portion thereof, contains plaintext sensitive data. In some examples, user-plane data may include a classification label of "sensitive." Other examples of classification labels include company proprietary, confidential, or secret data. In some examples, user-plane data may be associated with a sensitivity score that is consistent with the classification label. For example, user-plane data with a "sensitive" classification label may be assigned a high sensitivity score. In other examples, the presence of plaintext sensitive data may be inferred based on analysis by the security monitoring application. Here, the user-plane data may receive lower sensitivity scores, based on a likely presence (e.g. sensitivity scores) of plaintext sensitive data.

In any case, the security monitoring application may quarantine or encrypt user-plane data based at least in part on sensitivity scores. Sensitivity scores may be compared to a predetermined sensitivity threshold, and user-plane data with a sensitivity score that is greater than or equal to the predetermined sensitivity threshold may be quarantined, encrypted, or both. The threshold may be set by an operator of the security monitoring application.

Further, if the security monitoring application determines that the user-plane data includes plaintext sensitive data, the security monitoring application may quarantine the user-plane data and suspend the related computing operation. The security monitoring application may generate a message for display on a user-interface of the user device that indicates that the computing operation was suspended and the user-plane data, quarantined. The message may also include selectable options to accept the suspension, thereby terminating the computing operation, or permit the execution of the computing operation with the plaintext sensitive data.

In various examples, the security monitoring application may determine whether the underlying user application is configured to permit encryption of the user-plane data using an encryption protocol accessible via the user device. For example, the security monitoring application may include a set of encryption protocols that can be used to encrypt plaintext sensitive data prior to executing a computing operation. The security monitoring application may encrypt the portion of user-plane data that includes the plaintext sensitive data, or encrypt the user-plane data, in its entirety.

An initial check is required to ensure that the underlying user application is configured to use an encryption protocol accessible via the user device. The initial check also involves ensuring that a recipient device can decrypt the encrypted plaintext sensitive data. A user application may access the encryption protocol on the user device via an Application Programming Interface (API) call and thus initiate encryption of plaintext sensitive data in real-time, or near-real-time relative to initiating a computing operation. The term "real-time" is intended to describe instantaneous encryption of plaintext sensitive data relative to the actual time that the plaintext sensitive data is called. Near-real-time refers to a temporal delay between the time that the plaintext sensitive data is called and the time that the plaintext sensitive data is encrypted. The temporal delay may be one second, five seconds, or any other suitably appropriate time interval.

In another embodiment, the security monitoring application may be configured to support an encryption protocol that is facilitated by a transitive trust server. The transitive trust server may interface between the user device (e.g. security monitoring application) and a recipient device. For example, if the security monitoring application determines that the user-plane data—and plaintext sensitive data contained therein—is being transmitted to a recipient device, it may further determine whether the underlying user application and the recipient device each have a trust relationship with a transitive trust server. If a trust relationship is in place, the transitive trust server may be tasked with providing the underlying user application with a public key of an asymmetric private-public key pair that is associated with the recipient device. The security monitoring application may encrypt the user-plane data using the public key to create encrypted user-plane data, and in doing so, permit the execution of a computing operation using the encrypted user-plane data. The recipient device may then decrypt the encrypted user-plane data, upon receipt, using a counterpart private key of the same asymmetric private-public key pair. In this example, the transitive trust server acts as a Certificate Authority, trusted by the user device (e.g. sending device) and the recipient device.

In yet another embodiment, the security monitoring application may reside on a standalone device, namely a security monitoring controller, within an enterprise network. The enterprise network may be a public or a private network. The security monitoring controller may be communicatively coupled to computing devices within the enterprise network, such that the security monitoring controller may intercept and inspect data, in various forms (e.g. data streams, data segments, data frames, or data packets), that are transmitted between computing devices within the enterprise network, or intended for outboard transmission to a recipient device.

In this embodiment, the security monitoring controller may be configured to intercept and inspect data in its various forms within an enterprise network. For example, the security monitoring controller may intercept and inspect data packets handled by computing hardware within the enterprise network. The computing hardware may include hubs, repeaters, concentrators, amplifiers, and user devices (e.g. network interface cards). Moreover, the security monitoring controller may monitor at least one of the data streams or data frames handled by computing hardware, such as routers, bridges, switches, and user devices.

The term "techniques," as used herein, may refer to system(s), method(s), computer-readable instruction(s), module(s), algorithms, hardware logic, and/or operation(s) as permitted by the context described above and through the document.

Figure 1B:
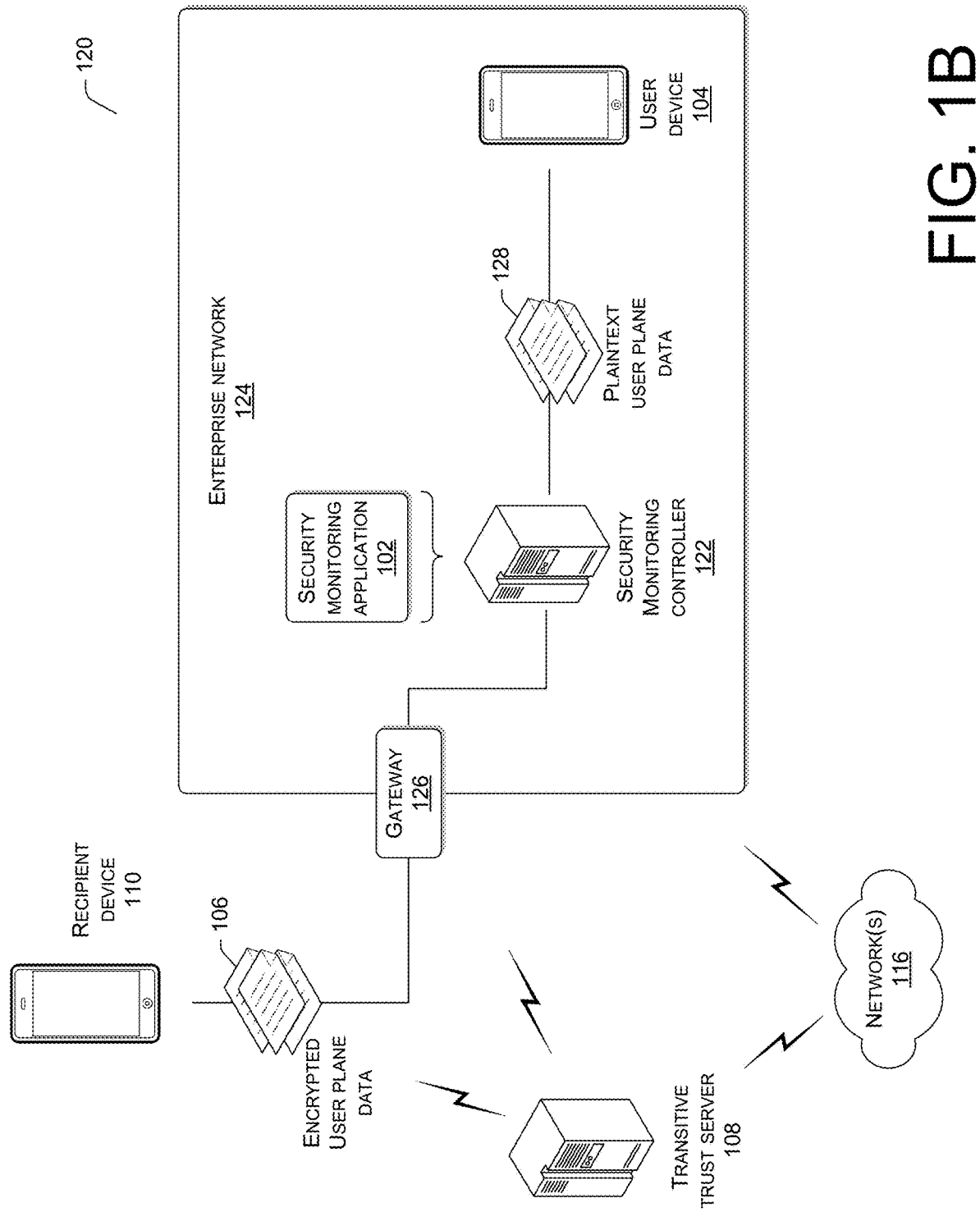

FIGS. 1A and 1B illustrate example computing environments that facilitate the operation of the security monitoring application. FIG. 1A illustrates a first computing environment 100 that facilitates a security monitoring application operating via a user device, in accordance with at least one embodiment. The security monitoring application 102 may reside on the user device 104 or may reside on a separate, remote server, that is accessible via the user device 104.

In the illustrated example, the security monitoring application 102 may monitor computing operations executed on the user device 104. The security monitoring application 102 may detect computing operations by monitoring application calls at the user application, application calls at a system bus of the user device, or application calls at a known source of plaintext sensitive data on the user device 104.

The security monitoring application 102 may inspect user-plane data associated with each monitored computing operation and in doing so, determine whether the computing operation involves plaintext sensitive data. If the computing operation involves plaintext sensitive data, the security monitoring application may perform acts to suspend the computing operation and quarantine the plaintext sensitive data. In the alternative, the security monitoring application 102 may encrypt the plaintext sensitive data to create encrypted user-plane data 106. The encrypted user-plane data 106 may comprise entirely of encrypted plaintext sensitive data or may comprise a combination of encrypted plaintext sensitive data and encrypted non-sensitive data. Alternatively, the encrypted user-plane data 106 may comprise encrypted plaintext sensitive data and plaintext non-sensitive data.

The security monitoring application 102 may create the encrypted user-plane data 106 via an encryption protocol native to the user device 104. For outbound transmission of plaintext sensitive data, the security monitoring application 102 may interact with a transitive trust server 108 to facilitate encryption of plaintext sensitive data. The transitive trust server 108 may act as a certificate authority between the user device and a recipient device 110. Accordingly, the transitive trust server 108 may encrypt plaintext sensitive data on the basis that the user device 104 and recipient device 110 each have a trust relationship with the transitive trust server 108.

In response to generating encrypted user-plane data 106, the user device 104 may transmit the encrypted user-plane data 106 to a base station node 112 for further transmission to a telecommunications network 114. The telecommunications network 114 may provide telecommunications and data communications in accordance with one or more technical standards, such as Enhanced Data Rates for GSM Evolution (EDGE), Wideband Code Division Multiple Access (W-CDMA), High-Speed Packet Access (HSPA), Long Term Evolution (LTE), 5G New Radio (5G NR), CDMA-2000 (Code Division Multiple Access 2000), and/or so forth. The telecommunications network 114 may include a core network that may provide telecommunication and data services to multiple computing devices, such as user device 104. The telecommunications network 114 may transmit the encrypted user-plane data 106 to a recipient device 110. The recipient device 110 may decrypt the encrypted user-plane data 106 using the same encryption protocol used to encrypt the user-plane data. In one embodiment, the recipient device 110 may interact with a transitive trust server 108 to decrypt the encrypted user-plane data 106. In another embodiment, the recipient device 110 may employ the same encryption protocol used to encrypt the user-plane data. The same encryption protocol may be natively stored on the recipient device 110 or may be accessed by the recipient device 110 via one or more network(s) 116.

The one or more network(s) 116 may include public networks such as the Internet, private networks such as an institutional and/or personal intranet, or some combination of a private and public network(s). The one or more network(s) can also include any suitable type of wired and/or wireless network, including but not limited to local area network (LANs), wide area network(s) (WANs), satellite networks, cable networks, Wi-Fi networks, Wi-Max networks, mobile communications networks (i.e. 5G-NR, LTE, 3G, 2G), or any suitable combination thereof.

Moreover, the user device 104 and recipient device 110 may include any suitable electronic device, such as a television unit, a multimedia streaming device, a cellular phone, a smartphone, a tablet computer, an electronic reader, a media player, a gaming device, a personal computer (PC), a laptop computer, etc. The user device 104 and recipient device 110 may also include network devices that act as intermediaries with the Internet. It is noteworthy that the Internet is accessible via one or more network(s) 116. In some examples, the user device 104 and recipient device 110 may include a subscriber identity module (SIM), such as an eSIM, to identify each device to a telecommunication service provider (also referred to herein, as "telecommunications network").

FIG. 1B illustrates a second computing environment 120 that facilitates a security monitoring application operating via a security monitoring controller within an enterprise network, in accordance with at least one embodiment. FIG. 1B includes various details relating to an operation of the security monitoring application 102 that was previously described with reference to FIG. 1A. As such, for brevity and ease of description, various details relating to the operation of the security monitoring application 102 as part of a security monitoring controller 122 have been omitted herein to the extent that the same or similar details have been provided with reference to FIG. 1A.

In the illustrated example, the security monitoring controller 122 may reside within an enterprise network 124. The enterprise network 124 may be any suitable public or private network. The enterprise network 124 may include a gateway 126 through which inbound and outbound data transmissions are funneled. The security monitoring controller 122 may be configured to intercept and inspect plaintext user-plane data 128 transmitted by the user device 104 within the enterprise network 124. The user device 104 may include any suitable electronic device, such as hubs, repeaters, concentrators, amplifiers, routers, bridges, and switches.

The security monitoring controller 122 may perform acts to suspend a computing operation of the user device 104 and quarantine plaintext user-plane data 128. Doing so may protect against an outbound transmission of the plaintext user-plane data 128. The security monitoring controller 122 may perform acts to encrypt the plaintext user-plane data 128 to create encrypted user-plane data 106. Encryption may occur via a native encryption protocol or may be facilitated by a transitive trust server 108. In this way, the security monitoring controller 122 may permit an outbound transmission of the encrypted user-plane data 106 (e.g. permit the suspended computing operation to occur) through the gateway 126 of the enterprise network 124.

The security monitoring controller 122 may operate on one or more distributed computing resource(s). The one or more distributed computing resource(s) may include one or more computing device(s) that operate in a cluster or other configuration to share resources, balance load, increase performance, provide fail-over support or redundancy, or for other purposes. The one or more computing device(s) may include one or more interfaces to enable communications with other networked devices, such as the user device 104 and transitive trust server 108 via one or more network(s) 116.

Figure 2A:
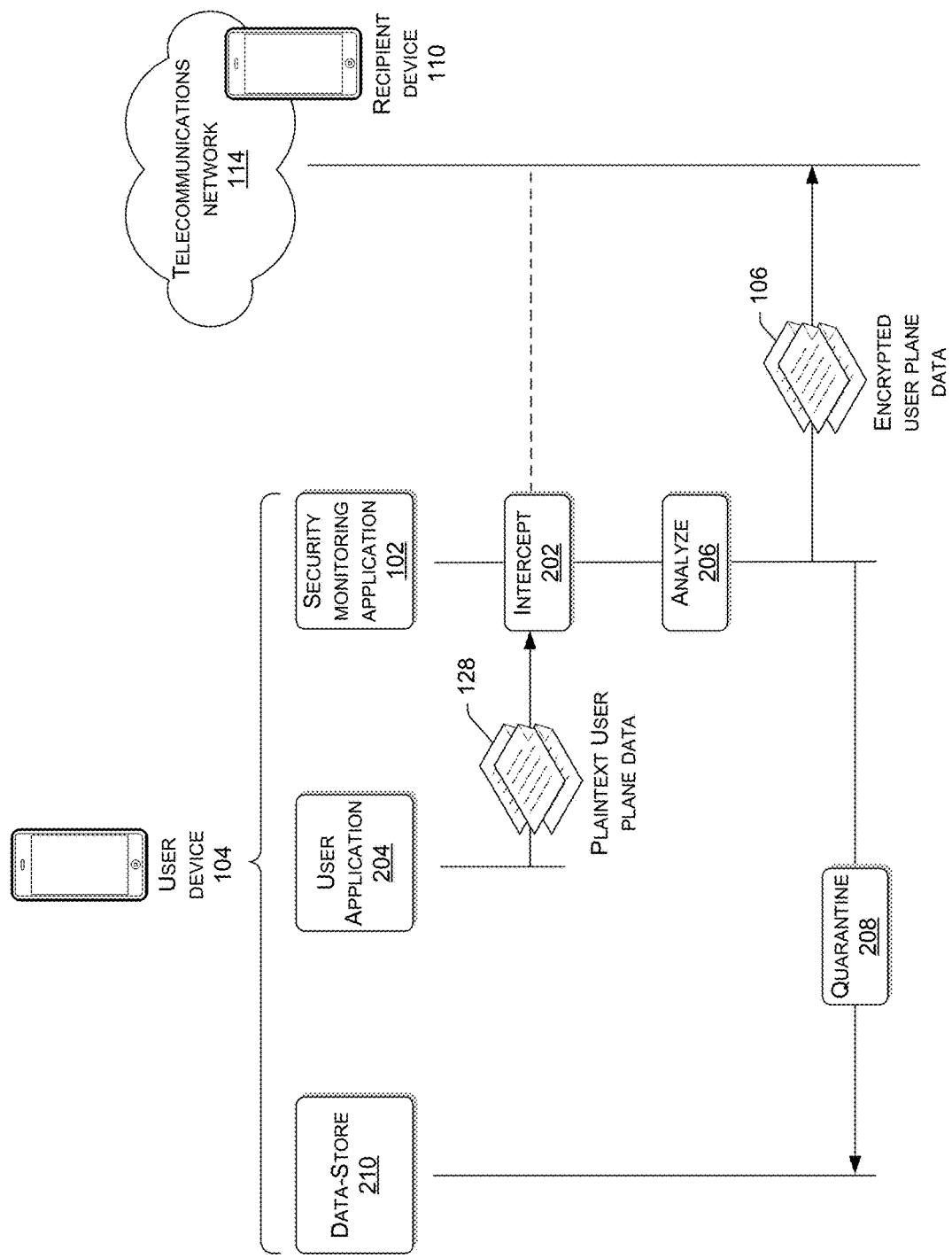
FIGS. 2A and 2B illustrate block diagrams for an operation of a security monitoring application that is configured to intercept and inspect user-plane data associated with a user application.
Figure 2B:
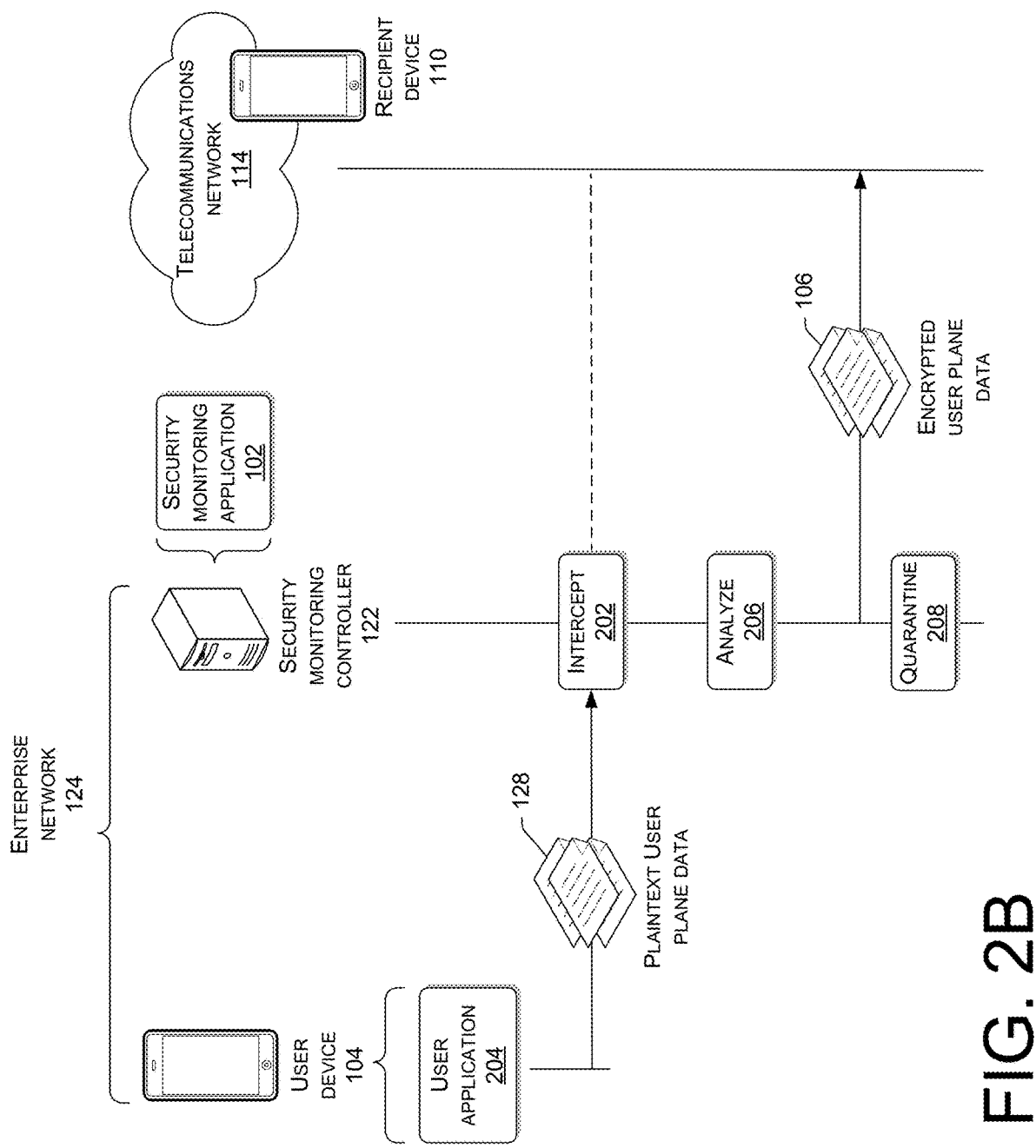

FIGS. 2A and 2B illustrate block diagrams for an operation of a security monitoring application that is configured to intercept and inspect user-plane data associated with a user application. FIG. 2A illustrates a block diagram for an operation of a security monitoring application that is accessible via a user device, in accordance with at least one embodiment At block 202, the security monitoring application 102 of a user device 104 may intercept a computing operation initiated by a user application 204 that involves plaintext user-plane data 128. At block 206, the security monitoring application 102 may analyze the plaintext user-plane data 128 to determine whether it includes plaintext sensitive data. If the plaintext user-plane data 128 includes plaintext sensitive data, the security monitoring application 102 may quarantine the plaintext user-plane data 128, transmit the plaintext user-plane data 128 as encrypted user-plane data 106, or based on user-selection, transmit the user-plane data as plaintext.

At block 208, the security monitoring application 102 may suspend the computing operation and quarantine the plaintext user-plane data 128, based on identifying plaintext sensitive data within the plaintext user-plane data 128. The security monitoring application 102 may quarantine the plaintext user-plane data 128 within a data store 210 of the user device 104. The security monitoring application 102 may notify the user of the user device 104 and provide selectable options to terminate the computing operation or permit the computing operation to occur with the plaintext user-plane data (e.g. plaintext sensitive data). For example, in response to determining that the plaintext user-plane data 128 includes plaintext sensitive data, the security monitoring application 102 may generate a message for display on a user-interface of the user device 104 that indicates that the computing operation was suspended and the plaintext user-plane data 128, quarantined. The message may further include selectable options to accept the suspension, thereby terminating the computing operation, or permit the execution of the computing operation with the plaintext sensitive data.

The security monitoring application 102 may encrypt the plaintext user-plane data 128 to create encrypted user-plane data 106 and transmit the encrypted user-plane data 106 to a telecommunications network 114, for further delivery to a recipient device 110. Encryption of the plaintext user-plane data 128 may be performed using an encryption protocol native to the user device 104 or via a transitive trust server 108. Prior to the selection and use of an encryption protocol, the security monitoring application 102 may perform an initial check to ensure that the user application 204, and recipient device 110, are configured to use the encryption protocol. Doing so ensures that the user-plane data can be encrypted and decrypted.

FIG. 2B illustrates a block diagram for an operation of a security monitoring controller within an enterprise network, in accordance with at least one embodiment. The user device 104, operating within an enterprise network 124, may execute a computing operation associated with a user application that includes plaintext user-plane data 128. The user application 204 may reside on the user device 104 or may reside on a separate server that is remotely accessible via the user device 104.

At block 202, the security monitoring controller 122 may intercept the computing operation. At block 206, the security monitoring controller may analyze the plaintext user-plane data 128 associated with the computing operation to determine whether it includes plaintext sensitive data. At block 208, the security monitoring controller 122 may quarantine the plaintext user-plane data 128 based on determining that the plaintext user-plane data 128 includes plaintext sensitive data.

In another embodiment, the security monitoring controller 122 may encrypt the plaintext user-plane data 1228 via an encryption protocol and transmit the encrypted user-plane data 106 to a telecommunications network 114, for further delivery to a recipient device 110.

In yet another embodiment, the security monitoring controller 122 may transmit the plaintext user-plane data 128 to the telecommunications network 114 as plaintext, based on user-selection. For example, in response to determining that the plaintext user-plane data 128 includes plaintext sensitive data, the security monitoring controller 122 may generate a message for display on a user-interface of the user device that indicates that the computing operation was suspended and the plaintext user-plane data 128, quarantined. The message may further include selectable options to accept the suspension, thereby terminating the computing operation, or permit the execution of the computing operation with the plaintext sensitive data.

Figure 3:
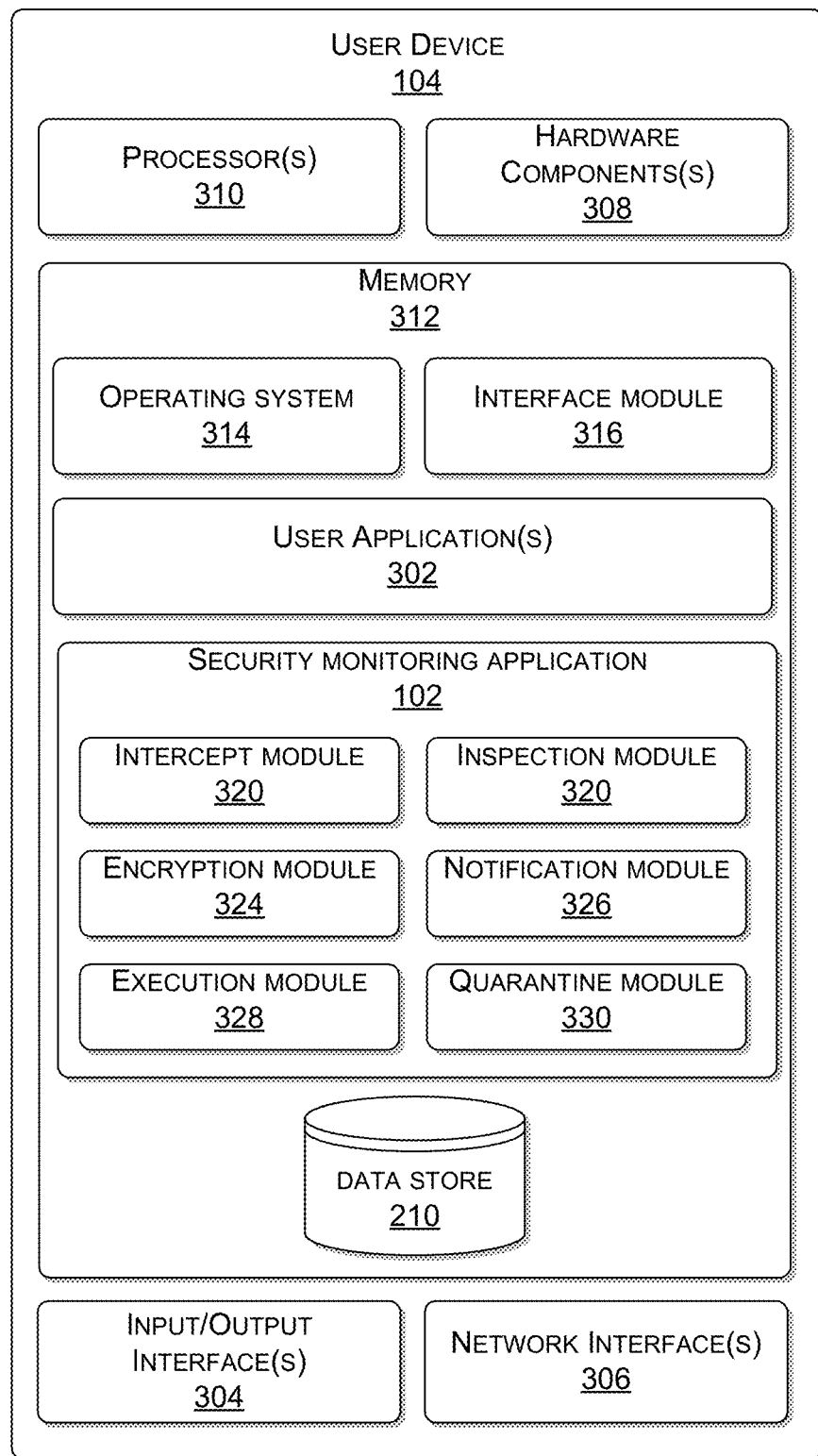
FIG. 3 illustrates various components of an example user device that includes a security monitoring application.

FIG. 3 illustrates various components of an example user device that includes a security monitoring application. In the illustrated example, the security monitoring application 102 resides on the user device 104. In an alternate embodiment, the security monitoring application 102 may reside on a separate, remote server that is accessible by the user device 104 via one or more network(s) 116. The security monitoring application 102 may operate to intercept and inspect user-plane data called by user application(s) 302, such as user application 204, on the user device 104. The user-plane data may be inspected at various OSI layers of the user device 104 and in various forms, such as data streams, data segments, data frames, data packets, or any suitable combination thereof.

The user device 104 may include input/output interface(s) 304. The input/output interface(s) 304 may include any suitable type of output interface known in the art, such as a display (e.g. a liquid crystal display), speakers, a vibrating mechanism, or a tactile feedback mechanism. Input/output interface(s) 304 also includes ports for one or more peripheral devices, such as headphones, peripheral speakers, or a peripheral display. Further, the input/output interface(s) 304 may further include a camera, a microphone, a keyboard/keypad, or a touch-sensitive display. A keyboard/keypad may be a push-button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the security monitoring controller 122 may include network interface(s) 306. The network interface(s) 306 may include any suitable sort of transceiver known in the art. For example, the network interface(s) 306 may include a radio transceiver that performs the function of transmitting and receiving radio frequency communications via an antenna. Also, the network interface(s) 306 may include a wireless communication transceiver and a near-field antenna for communicating over unlicensed wireless Internet Protocol (IP) networks, such as local wireless data networks and personal area networks (e.g. Bluetooth or near field communication (NFC) networks). Further, the network interface(s) 306 may include wired communication components, such as an Ethernet port or a Universal Serial Bus (USB). Hardware component(s) 308 may include additional hardware interface, data communication hardware, and data storage hardware.

Further, the security monitoring controller 122 may include one or more processor(s) 310 that are operably connected to memory 312. In at least one example, the one or more processor(s) 310 may be a central processing unit(s) (CPU), graphics processing unit(s) (GPU), or both a CPU and GPU or any suitable sort of processing unit(s). Each of the one or more processor(s) 310 may have numerous arithmetic logic units (ALUs) that perform arithmetic and logical operations as well as one or more control units (CUs) that extract instructions and stored content from processor cache memory, and then execute these instructions by calling on the ALUs, as necessary during program execution. The one or more processor(s) 310 may also be responsible for executing all computer applications stored in the memory, which can be associated with common types of volatile (RAM) and/or non-volatile (ROM) memory.

In some examples, memory 312 may include system memory, which may be volatile (such as RAM), non-volatile (such as ROM, flash memory, etc.), or some combination of the two. The memory may also include additional data storage devices (removable and/or non-removable) such as, for example, magnetic disks, optical disks, or tape.

The memory 312 may further include non-transitory computer-readable media, such as volatile and nonvolatile, removable and non-removable media implemented in any suitable method or technology for storage of information, such as computer-readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any suitable non-transitory medium which can be used to store the desired information.

In the illustrated example, the memory 312 may include an operating system 314, an interface module 316, user application(s) 302, a security monitoring application 318, and a data store 210. The operating system 314 may be any suitable operating system capable of managing computer hardware and software resources. The operating system 314 may include an interface layer that enables applications to interface with the input/output interface(s) 304 and the network interface(s) 306.

The interface module 316 may be configured to interact with recipient devices that are intended to receive user-plane data from a user application. Here, the interface module 316 may determine whether recipient devices are configured to use an encryption protocol native to the user device 104 or to a transitive trust server 108. The interface module 316 may be configured to interact with a transitive trust server 108 to determine whether trust relationships are in place with user applications native to the user device 104 and recipient devices that are intended to receive user-plane data. The interface module 316 may further interact with a transitive trust server 108 to facilitate an encryption of plaintext sensitive data.

The user application(s) 302 may include any suitable application executable via the user device 104. The user application(s) 302 may reside in the memory 312 of the user device 104 or reside on a separate server that is remotely accessible by the user device 104.

The security monitoring application 102 may further include an intercept module 320, an inspection module 322, an encryption module 324, a notification module 326, an execution module 328, and a quarantine module 330. The intercept module 320 may be configured to intercept a computing operation executed by a user application. The computing operation may relate to a change in data state (e.g. data at rest, data in transit, and data in use). The intercept module 320 may detect a computing operation by monitoring application calls at the user application, application calls at a system bus of the user device, or application calls at a known source of user-plane data on the user device. A known source of user-plane data may include sensor(s), such as a GPS sensor, or a data-store.

Moreover, the intercept module 320 may detect an application call at one of the OSI layers of the user device. The OSI layers include the application layer, transport layer, network layer, data link layer, or physical layer.

The inspection module 322 may be configured to inspect user-plane data associated with a computing operation to determine whether the user-plane data includes plaintext sensitive data. If plaintext sensitive data is identified, the inspection module 322 may transmit instructions indicating the same to the quarantine module 330.

In one embodiment, the inspection module 322 may employ one or more trained machine-learning algorithms to identify plaintext sensitive data within the user-plane data. For example, the inspection module 322 may inspect the user-plane data to identify an application identifier. The application identifier may be used to identify the user application. In doing so, the inspection module 322 may analyze historical instances of data usage by the user application to infer a likelihood that the user-plane data includes plaintext sensitive data.

In another embodiment, the inspection module 322 may identify the source of the user-plane data that is associated with the computing operation, and in doing so, infer whether the user-plane data includes plaintext sensitive data. For example, the user application may capture geolocation data from a GPS sensor, appointment data from a calendar application, contact data from a user profile application, or private (e.g. personal or organizational) data from a secure repository.

In yet another example, the inspection module 322 may employ one or more trained machine-learning algorithms to identify data patterns within the user-plane data that are consistent with plaintext sensitive data. For example, device identifiers, contact data, and precise geolocation data may adhere to an established format. Accordingly, the inspection module 322 may parse through the user-plane data to identify a character-string consistent with the established formats, and in doing so, infer the presence of plaintext sensitive data.

The inspection module 322 may assign a sensitivity score to the user-plane data to reflect the likelihood that plaintext sensitive data is included. The sensitivity score may be alpha-numeric (i.e. 0 to 10, or A to F), descriptive, (i.e. low, medium, or high), based on color (i.e. green, yellow, red), or any suitable rating scale. A high safety score (i.e. 7 to 10, high, red) may indicate that the user-plane data very likely, if not definitively, includes plaintext sensitive data. An example may include identifying a user application that provides marketplace recommendations based on a user device's current geolocation, whereby an unencrypted precise geolocation is considered plaintext sensitive data. A medium safety score (i.e. 4 to 6, medium, yellow) may indicate a likelihood that the user plane data includes plaintext sensitive data. An example may include identifying a user application that has historically, at times, selectively accessed calendar information or contact information from a user profile. A low safety score (i.e. 1 to 3, low, green) may indicate a very low likelihood that the user-plane data includes plaintext sensitive data. An example may include identifying a user application that has not historically, accessed plaintext sensitive data, or a user application that is not configured to receive or process plaintext sensitive data.

The inspection module 322 may earmark user-plane data for quarantine based on the likelihood that the user-plane data includes plaintext sensitive data. The sensitivity score associated with user-plane data may be compared with a predetermined sensitivity threshold, and if the sensitivity score is greater than or equal to the predetermined sensitivity threshold, the inspection module 322 may infer that the user-plane data includes plaintext sensitive data. The predetermined sensitivity threshold may be set by an operator of the security monitoring application.

The encryption module 324 may be configured to encrypt the plaintext sensitive data to create encrypted plaintext sensitive data. The encryption module 324 may use encryption protocols, such as the Digital Signature Algorithm (DSA), Rivest-Shamir-Adelman (RSA), or Elliptical Curve DSA, to encrypt plaintext sensitive data. The encryption protocols may be native to the encryption module 324 or may be accessible via a separate, remote server, such as a transitive trust server.

In a suitable embodiment, the encryption module 324 may interact with the execution module 328. For example, the encryption module 324 may receive a query from the execution module 328 to determine whether a user application is configured to use an encryption protocol that is native to the user device 104, or accessible via a transitive trust server 108. Accordingly, the encryption module 324 may determine whether the user application is configured to use an available encryption protocol. If so, the encryption module 324 may encrypt plaintext sensitive data, as received from the execution module 328, and return encrypted plaintext sensitive data.

The encryption module 324 may use an encryption protocol native to the user device 104 or may interact with a transitive trust server to encrypt the plaintext sensitive data. Referring to the latter, the encryption module 324 may determine whether the transitive trust server has a trust relationship with the user application and a recipient device that is to receive the plaintext sensitive data. If a trust relationship is in place, the transitive trust server may provide the underlying user application with a public key of an asymmetric private-public key pair that is associated with the recipient device. The encryption module 324 may encrypt the user-plane data using the public key to create encrypted user-plane data. The recipient device may then decrypt the encrypted user-plane data, upon receipt, using a counterpart private key of the same asymmetric private-public key pair.

Further, the encryption module 324 may interact with the quarantine module 330 to encrypt plaintext sensitive data that is intended for quarantine within the data store 210. The encryption module 324 may use an encryption protocol that is native to the user device 104.

The notification module 326 may be configured to generate a message for display on the user-interface of the user device 104. The message may indicate that plaintext sensitive data is present within user-plane data and that the corresponding computing operation was suspended. The message may further include selectable options to accept the suspension, thereby terminating the computing operation, or permit the execution of the computing operation with the plaintext sensitivity data. In a suitable embodiment, the notification module 326 may interact with the execution module 328 based on receiving a user selection to suspend to permit the execution of the computing operation.

The execution module 328 may be configured to suspend, terminate, or permit the execution of a computing operation that includes plaintext sensitive data. In a suitable embodiment, the execution module 328 may interact with various other modules of the security monitoring application 318 to determine whether to execute a computing operation. The execution module 328 may receive an indication from the inspection module 322 that user-plane data includes plaintext sensitive data. In doing so, the execution module 328 may act to suspect the computing operation and interact with the quarantine module 330 to quarantine the user-plane data.

In one embodiment, the execution module 328 may act to remove (e.g. purge) or redact the plaintext sensitive data from the user-plane data to create modified user-plane data. The plaintext sensitive data may be replaced with non-sensitive placeholder data. For example, precise geolocation data may be replaced with less precise geolocation data. The less precise geolocation data may provide a geolocation that is a random distance in a random orientation away from the geolocation indicated by the precise geolocation. These random variations may be introduced by the execution module 328. Further, the execution module 328 may interact with the encryption module 324 to encrypt the plaintext sensitive data that is removed or redacted and further interact with the quarantine module 330 to store the encrypted plaintext sensitive data in the data store 210. In this example, the execution module 328 may permit the computing operation to occur with the modified user-plane data.

In another embodiment, the execution module 328 may interact with the encryption module 324 to determine whether the underlying user application that initiated the computing operation is configured to permit encryption of the plaintext sensitive data using an encryption protocol accessible via the user device. The encryption protocol may be native to the user device or may be accessible via a transitive trust server. Referring to the latter, the execution module 328 may interact with the encryption module 324 to determine whether the underlying user application and recipient device of the user-plane data each have a trust relationship with the transitive trust server.

If the underlying user application is configured to use an encryption protocol native to the user device or via a transitive trust server, the execution module 328 may interact with the encryption module 324 to facilitate encryption of the user-plane data, and the computing operation may be permitted to occur with the encrypted user-plane data.

In yet another embodiment, the execution module 328 may interact with the notification module 326 to determine whether to terminate the computing operation or permit the computing operation to occur with the plaintext sensitive data. For example, the notification module 326 may provide an indication to the execution module 328 that a user associated with the user device 104 has elected to permit the computing operation to occur with the plaintext sensitive data. Accordingly, the execution module 328 may permit the computing operation to occur with the plaintext sensitive data. Alternatively, the notification module 326 may generate a message indicating that the user has elected to terminate the computing operation. The execution module 328 may terminate the computing operation and interact with the quarantine module 330 to quarantine the plaintext sensitive data.

The quarantine module 330 may be configured to quarantine plaintext sensitive data. The quarantine module 330 may interact with the encryption module 324 to encrypt plaintext sensitive data that is earmarked for quarantine. The quarantine module 330 may store the encrypted plaintext sensitive data in the data store 210. The quarantine module 330 may quarantine plaintext sensitive data in various ways. In one example, the entirety of user-plane data that includes plaintext sensitive data may be quarantined. In another example, subsets of the user-plane data that are identified as being plaintext sensitive data may be quarantined. This includes plaintext sensitive data that the execution module 328 has been removed or redacted from the user-plane data.

The data store 210 may include a repository of encryption protocols, quarantined plaintext sensitive data (e.g. plaintext sensitive data that is encrypted by the encryption module 324), user application profile data, historical instances of data usage by user applications, and any suitable data pertinent to an operation of the security monitoring application 102.

Further, the security monitoring application 102, via various modules and components may make use of one or more trained machine-learning algorithms such as supervised learning, unsupervised learning, semi-supervised learning, naive Bayes, Bayesian network, decision trees, neural networks, fuzzy logic models, and/or probabilistic classification models.

Figure 4:
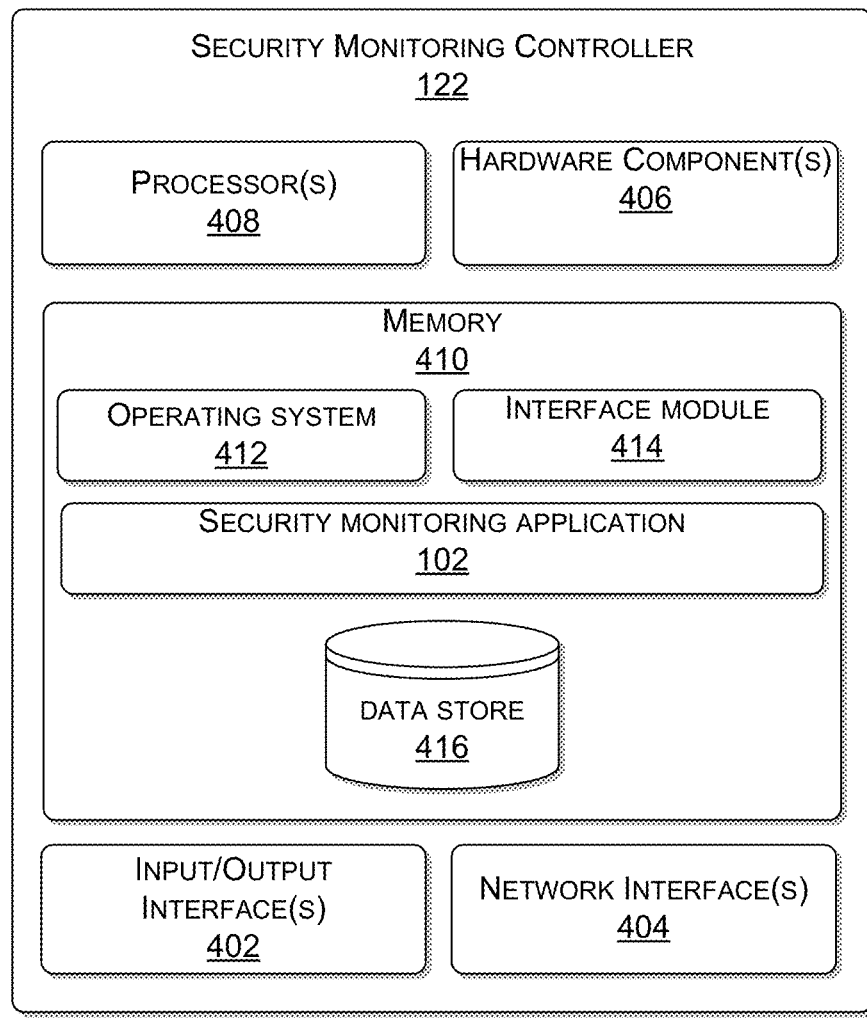
FIG. 4 illustrates various components of an example security monitoring controller.

FIG. 4 illustrates various components of an example security monitoring controller. The security monitoring controller 122 may operate with an enterprise network. The enterprise network may be a public or a private network. The security monitoring controller 122 may be communicatively coupled to computing devices within the enterprise network, such that it may intercept and inspect the flow of user-plane data within the enterprise network. The user-plane data may be inspected at various OSI layers of the user device and in various forms, such as data streams, data segments, data frames, or data packets.

The security monitoring controller 122 may include input/output interface(s) 402 and network interface(s) 404. The input/output interface(s) 402 may be similar to input/output interface(s) 304, and the network interface(s) 404 may be similar to network interface(s) 306. Hardware component(s) 406 may include additional hardware interface, data communication hardware, and data storage hardware.

The security monitoring controller 122 may include one or more processor(s) 408 that are operably connected to memory 410. The one or more processor(s) 408 may be similar to the one or more processor(s) 310, and the memory 410 may be similar to the memory 312.

The memory 410 may include an operating system 412, an interface module 414, a security monitoring application 102, and a data store 416. The operating system 412 may be any suitable operating system capable of managing computer hardware and software resources. The operating system 412 may include an interface layer that enables applications to interface with the input/output interface(s) 402 and the network interface(s) 404. The security monitoring application 102 has similar modules that perform similar functions to the security monitoring application 102 of FIG. 3.

The interface module 414 may be similar to the interface module 316 with additional functionality to interface with computing devices within an enterprise network, and thereby intercept user-plane data in various forms (e.g. data streams, data segments, data frames, or data packets), that are transmitted between the computing devices within the enterprise network, or intended for outbound transmission to a recipient device.

The data store 416 may include a repository of encryption protocols, quarantined plaintext sensitive data (e.g. plaintext sensitive data that is encrypted by the encryption module 324), user application profile data, computing device profile data for computing devices operating within the enterprise network, historical instances of data usage by user applications, and any suitable data pertinent to an operation of the security monitoring application 102.

Figure 5:
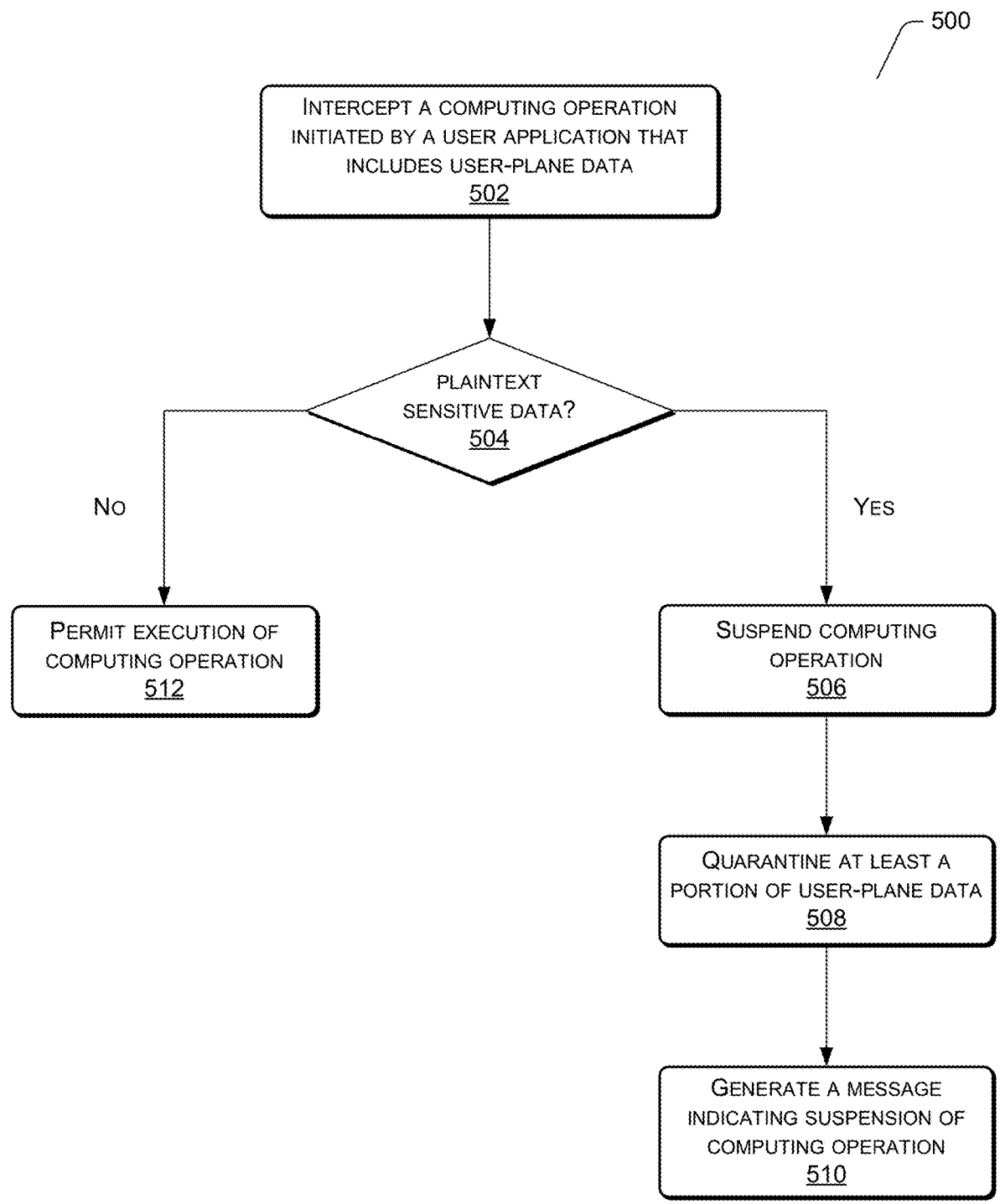
FIG. 5 illustrates an exemplary process for determining whether to suspend a computing operation and quarantine user-plane data based on detecting plaintext sensitive data, in accordance with at least one embodiment.
Figure 6:
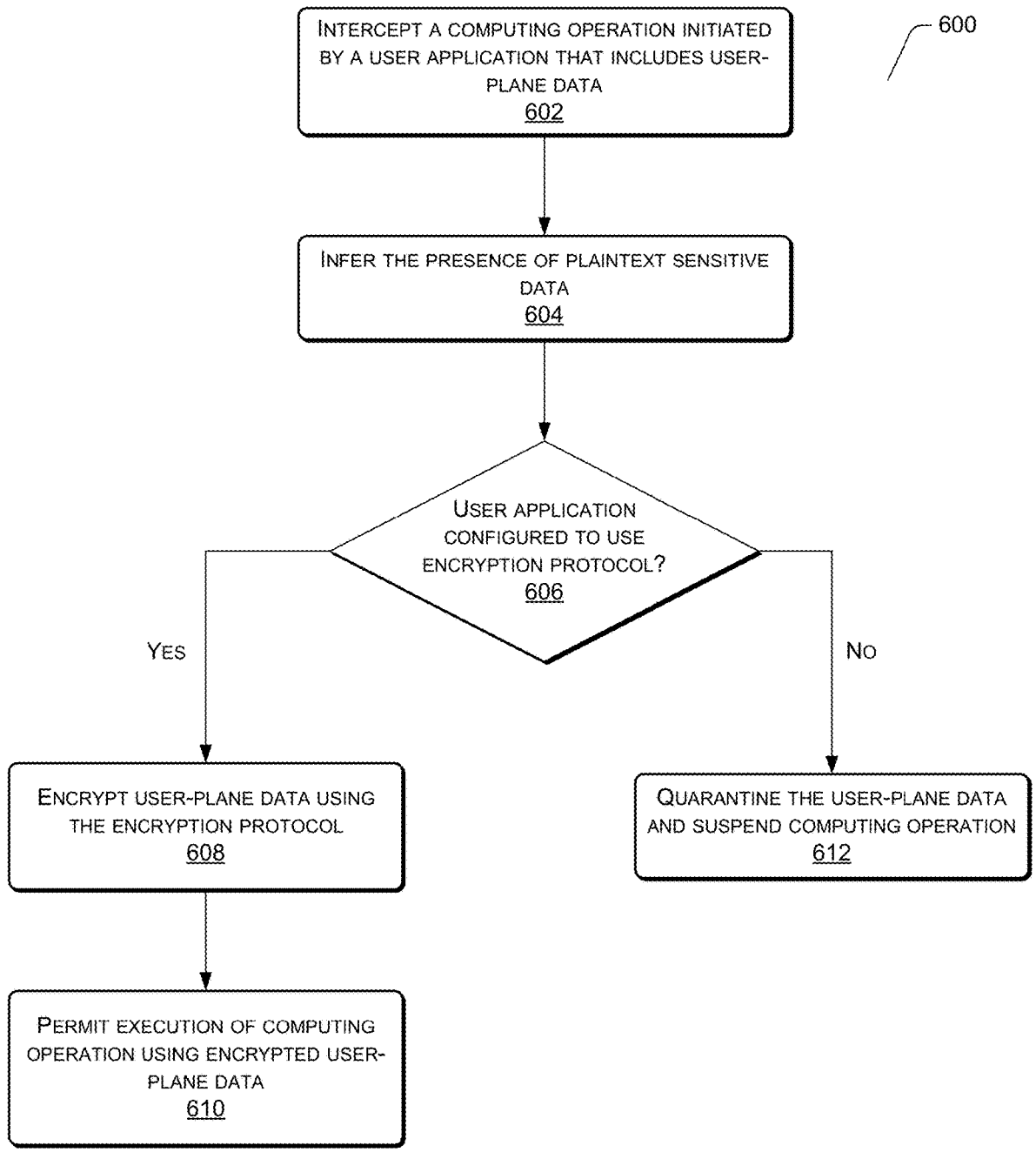
FIG. 6 illustrates an exemplary process for selectively encrypting plaintext sensitive data via an available encryption protocol, in accordance with at least one embodiment.

FIGS. 5 and 6 present processes 500 and 600 that relate to operations of a security monitoring application 102 executed by a user device 104 or a security monitoring controller 122. Each of processes 500 and 600 illustrate a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 500 and 600 are described with reference to the first computing environment 100 and the second computing environment 120 of FIGS. 1A and 1B, respectively.

FIG. 5 illustrates an exemplary process for determining whether to suspend a computing operation and quarantine user-plane data based on detecting plaintext sensitive data, in accordance with at least one embodiment. Process 500 is described from the perspective of a security monitoring application that resides on a user device or is accessible by the user device via one or more network(s). One of ordinary skill in the art may appreciate that variations and modifications can be made such that security monitoring application may operate within a security monitoring controller that monitors the flow of user-plane data within an enterprise network.

At 502, the security monitoring application may intercept a computing operation initiated by a user application that involves user-plane data. The computing operation may involve a call from a user application to retrieve user-plane data from a repository, process user-plane data, transmit user-plane data, or any suitable combination thereof.

At 504, the security monitoring application may determine whether the user-plane data includes plaintext sensitive data. In one example, the security monitoring application may identify a user application associated with the computing operation and infer whether or not the user-plane data includes plaintext sensitive data based on historical instances of data usage by the user application. In another example, the security monitoring application may identify the source of the user-plane data, and in doing so, infer whether plaintext sensitive data is included. In yet another example, the security monitoring application analyzes the user-plane data to determine whether plaintext sensitive data is included.

At 506, the security monitoring application may determine that the user-plane data does include plaintext sensitive data. In doing so, the security monitoring application may suspend the computing operation.

At 508, the security monitoring application may quarantine the user-plane data in a data store. In another embodiment, the security monitoring application may separate the plaintext sensitive data from remaining portions of the user-plane data and quarantine the plaintext sensitive data. The quarantine process involves encrypting the plaintext sensitive data to create encrypted plaintext sensitive data (e.g. non-sensitive data). The security monitoring application may permit the computing operation to occur with the remaining portions of the user-plane data.

At 510, the security monitoring application may generate a message for display on a user-interface of the user device. The message may indicate that the computing operation was suspended, and the user-plane data, or portion containing plaintext sensitive data, has been quarantined. In one embodiment, the message may further include selectable operations to accept the suspension, thereby terminating the computing operation, or permit the execution of the computing operation using the plaintext sensitive data. Accordingly, the security monitoring application may terminate or execute the computing operation based on a response to the selectable options.

At 512, the security monitoring application may determine that the user-plane data does not include plaintext sensitive data. In one embodiment, the security monitoring application may detect, or infer the presence of, plaintext sensitive data. In another embodiment, the security monitoring application may determine that the user-plane data, or portion thereof, is encrypted. The security monitoring application may further determine that an unencrypted portion of the user-plane data if any, does not include plaintext sensitive data. In these embodiments, the security monitoring application may permit the execution of the computing operation.

FIG. 6 illustrates an exemplary process for selectively encrypting plaintext sensitive data via an available encryption protocol, in accordance with at least one embodiment.

The encryption protocol may reside on the user device or may be accessible via a transitive trust server. Process 600 is described from the perspective of a security monitoring application that resides on a user device or is accessible by the user device via one or more network(s). One of ordinary skill in the art may appreciate that variations and modifications can be made such that the security monitoring application may operate within a security monitoring controller that monitors the flow of user-plane data within an enterprise network.

At 602, the security monitoring application may intercept a computing operation initiated by a user application that includes user-plane data. The computing operation may involve a call from a user application to retrieve user-plane data from a repository, process user-plane data, transmit user-plane data, or any suitable combination thereof.

At 604, the security monitoring application may infer the presence of plaintext sensitive data. The security monitoring application may infer the presence of plaintext sensitive data by analyzing historical instances of data usage associated with the user application or identifying the source of the plaintext sensitive data (e.g. GPS sensor). In another example, the security monitoring application may analyze the user-plane data to identify plaintext sensitive data.

At 606, the security monitoring application may determine whether the underlying user application is configured to use an encryption protocol accessible via the user device to encrypt the user-plane data, which includes plaintext sensitive data, prior to executing the computing operation. The security monitoring application may further determine whether the recipient device is configured to decrypt the encrypted user-plane data.

The encryption protocol may reside on the user device or may be accessible by the user device via one or more network(s). In the latter embodiment, the encryption protocol may reside on a transitive trust server that interfaces between the user device (e.g. security monitoring application) and a recipient device. Here, the security monitoring application of the user device may determine whether the user device and the recipient device have each established a trust relationship with the transitive trust server prior to permitting the transitive trust server to encrypt the user-plane data.

At 608, the security monitoring application may determine that the underlying user application is configured to use an encryption protocol to encrypt the user-plane data. In doing so, the security monitoring application may encrypt the user-plane data using the selected encryption protocol. Encryption may involve the use of an asymmetric public-private key pair, shared between the user device and recipient device, or shared via a transitive trust server. Referring to the latter, the transitive trust server may provide each of the user devices with a public key of an asymmetric private-public key pair that is associated with the recipient device.

At 610, the security monitoring application may permit the execution of the computing operation using the encrypted user-plane data. In doing so, the recipient device may decrypt the encrypted user-plane data using a counterpart private key of the same asymmetric private-public key pair.

At 612, the security monitoring application may determine that the underlying user application is not configured to use an encryption protocol to encrypt the user-plane data. In doing so, the security monitoring application may quarantine the user-plane data, which includes the plaintext sensitive data, and suspend the related computing operation.

The security monitoring application may generate a message for display on a user-interface of the user device. The message may indicate that the computing operation was suspended, and the user-plane data was quarantined. The message may also include selectable options to accept the suspension, thereby terminating the computing operation, or permit the execution of the computing operation with the plaintext sensitive data.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A user device, comprising:
one or more processors; and
memory coupled to the one or more processors, the memory including one or more modules that are executable by the one or more processors to:
intercept, at a security monitoring application, a computing operation executed by a user application, the computing operation including user-plane data;
analyze the user-plane data;
based on analyzing the user-plane data, determine a sensitivity score that reflects a likelihood that the user-plane data includes plaintext sensitive data;
compare the sensitivity score to a sensitivity score threshold;
in response to determining that the sensitivity score is equal to or greater than the sensitivity score threshold, quarantine the user-plane data;
in response to quarantining the user-plane data, generate plaintext placeholder data that is a generalization of the user-plane data and that is a same type of data as the plaintext sensitive data;
in response to quarantining the user-plane data, transmit a message to a user device associated with the user-plane data, the message including a first selectable object to terminate the computing operation and a second selectable object to permit the computing operation to occur; and
in response to receiving data indicating selection of the second selectable object to permit the computing operation to occur, provide the plaintext placeholder data to the computing operation, and permit execution of the computing operation by the user application and using the plaintext placeholder data.

2. The user device of claim 1, wherein the computing operation corresponds to an outbound transmission of the user-plane data to a recipient device, use of the user-plane data on the user device, or a storage of the user-plane data at a data-store of the user device.

3. The user device of claim 1, wherein the one or more modules are further executable by the one or more processors to:
identify the user application based at least in part on an application identifier included within the user-plane data, and
wherein quarantining the user-plane data is based at least in part on the application identifier.

4. The user device of claim 1, wherein the one or more modules are further executable by the one or more processors to:
  monitor plaintext device data captured by the user application from components of the user device, the plaintext device data including location data, user identifier data, or device identifier data, and
  wherein, the plaintext sensitive data includes the plaintext device data.

5. The user device of claim 1, wherein the one or more modules are further executable by the one or more processors to:
  determine that the user application is configured to permit encryption of the user-plane data using an encryption protocol accessible via the user device;
  encrypt, via the encryption protocol, the user-plane data to create an encrypted user-plane data; and
  permit an additional execution of the computing operation by the user application using the encrypted user-plane data.

6. The user device of claim 1, wherein the one or more modules are further executable by the one or more processors to:
  determine that the computing operation is associated with a transmission of the user-plane data to a recipient device;
  determine whether a trust relationship is active between the recipient device and a transitive trust server associated with the user device, the transitive trust server configured to provide a secure transmission of the user-plane data to the recipient device;
  in response to confirming that the trust relationship is active, retrieve, from the transitive trust server, a public key of an asymmetric private-public key pair that is associated with the recipient device; and
  encrypt, the user-plane data using the public key to create an encrypted user-plane data for transmission to the recipient device.

7. The user device of claim 1, wherein the one or more modules are further executable by the one or more processors to:
  display a message on a user interface of the user device that the plaintext sensitive data was quarantined.

8. A security monitoring controller, comprising:
  one or more processors; and
  memory coupled to the one or more processors, the memory including one or more modules that are executable by the one or more processors to:
   intercept, within a network, a computing operation executed via a user device that includes user-plane data;
   analyze the user-plane data;
   based on analyzing the user-plane data, determine a sensitivity score that reflects a likelihood that the user-plane data includes plaintext sensitive data;
   compare the sensitivity score to a sensitivity score threshold;
   in response to determining that the sensitivity score is equal to or greater than the sensitivity score threshold, quarantine the user-plane data;
   in response to quarantining the user-plane data, generate plaintext placeholder data that is a generalization of the user-plane data and that is a same type of data as the plaintext sensitive data;
   in response to quarantining the user-plane data, transmit a message to a user device associated with the user-plane data, the message including a first selectable object to terminate the computing operation and a second selectable object to permit the computing operation to occur; and
   in response to receiving data indicating selection of the second selectable object to permit the computing operation to occur, provide the plaintext placeholder data to the computing operation, and permit execution of the computing operation using the plaintext placeholder data.

9. The security monitoring controller of claim 8, wherein the one or more modules are further executable by the one or more processors to:
  analyze the user-plane data to identify a user application associated with the computing operation, and
  wherein, analyzing the user-plane data is based at least in part on identifying the user application.

10. The security monitoring controller of claim 8, wherein the computing operation corresponds to an outbound transmission of the user-plane data to a recipient device, and wherein the one or more modules are further executable by the one or more processors to:
  determine whether the recipient device is configured to use a particular encryption protocol to decrypt an encryption of the user-plane data;
  in response to determining that the recipient device is configured to use the particular encryption protocol, encrypt the user-plane data to create encrypted user-plane data; and
  permit an additional execution of the computing operation using the encrypted user-plane data.

11. The security monitoring controller of claim 8, wherein the computing operation corresponds to an outbound transmission of the user-plane data to a recipient device, and wherein the one or more modules are further executable by the one or more processors to:
  determine whether a trust relationship is active between the recipient device and a transitive trust server associated with the security monitoring controller, the transitive trust server configured to provide a secure transmission of the user-plane data to the recipient device;
  in response to confirming that the trust relationship is active, retrieve, from the transitive trust server, a public key of an asymmetric private-public key pair that is associated with the recipient device; and
  encrypt, the user-plane data using the public key to create an encrypted user-plane data for transmission to the recipient device.

12. The security monitoring controller of claim 8, wherein the one or more modules are further executable by the one or more processor to:
  monitor data packets handled by a computing hardware within the network, the computing hardware corresponding to one or more of network interface cards, hubs, repeaters, concentrators, or amplifiers, and
  wherein, intercepting the computing operation associated with the user device is based at least in part on monitoring the data packets.

13. The security monitoring controller of claim 8, wherein the one or more modules are further executable by the one or more processor to:
  monitor at least one of data streams or data frames handled by a computing hardware within the network, the computing hardware corresponding to one or more of routers, bridges, switches, and user devices, and wherein intercepting the computing operation associated with the user device is based at least in part on monitoring the at least one of the data streams or the data frames.

14. The security monitoring controller of claim 8, wherein the plaintext sensitive data corresponds to location data, user identifying data, device-identifying data, user calendar data, or financial data.

15. A computer-implemented method, comprising:
under control of one or more processors:
   intercepting, at a security monitoring application, a computing operation executed by a user application, the computing operation including user-plane data;
   analyzing the user-plane data;
   based on analyzing the user-plane data, determining a sensitivity score that reflects a likelihood that the user-plane data includes plaintext sensitive data;
   comparing the sensitivity score to a sensitivity score threshold;
   in response to determining that the sensitivity score is equal to or greater than the sensitivity score threshold, quarantine the user-plane data;
   in response to quarantining the user-plane data, generating plaintext placeholder data that is a generalization of the user-plane data and that is a same type of data as the plaintext sensitive data;
   in response to quarantining the user-plane data, transmit a message to a user device associated with the user-plane data, the message including a first selectable object to terminate the computing operation and a second selectable object to permit the computing operation to occur; and
   in response to receiving data indicating selection of the second selectable object to permit the computing operation to occur, providing the plaintext placeholder data to the computing operation, and permitting execution of the computing operation by the user application and using the plaintext placeholder data.

16. The method of claim 15, wherein the computing operation corresponds to an outbound transmission of the user-plane data to a recipient device, use of the user-plane data on the user device, or a storage of the user-plane data at a data-store of the user device.

17. The method of claim 15, further comprising:
identify the user application based at least in part on an application identifier included within the user-plane data, and
wherein quarantining the user-plane data is based at least in part on the application identifier.

18. The method of claim 15, further comprising:
monitor plaintext device data captured by the user application from components of the user device, the plaintext device data including location data, user identifier data, or device identifier data, and
wherein, the plaintext sensitive data includes the plaintext device data.

19. The method of claim 15, further comprising:
determining that the user application is configured to permit encryption of the user-plane data using an encryption protocol accessible via the user device;
encrypting, via the encryption protocol, the user-plane data to create an encrypted user-plane data; and
permitting an additional execution of the computing operation by the user application using the encrypted user-plane data.

20. The method of claim 15, further comprising:
determining that the computing operation is associated with a transmission of the user-plane data to a recipient device;
determining whether a trust relationship is active between the recipient device and a transitive trust server associated with the user device, the transitive trust server configured to provide a secure transmission of the user-plane data to the recipient device;
in response to confirming that the trust relationship is active, retrieving, from the transitive trust server, a public key of an asymmetric private-public key pair that is associated with the recipient device; and
encrypting, the user-plane data using the public key to create an encrypted user-plane data for transmission to the recipient device.

* * * * *